United States Patent
Goto

(10) Patent No.: US 12,437,894 B2
(45) Date of Patent: Oct. 7, 2025

(54) RADIATION TRANSMISSION PREVENTING FILM, AND RADIATION TRANSMISSION PREVENTING FILTER AND IMAGING DEVICE EACH UTILIZING SAID RADIATION TRANSMISSION PREVENTING FILM

(71) Applicant: NITTO DENKO CORPORATION, Ibaraki (JP)

(72) Inventor: Shusaku Goto, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 914 days.

(21) Appl. No.: 17/633,659

(22) PCT Filed: Jun. 18, 2020

(86) PCT No.: PCT/JP2020/023880
§ 371 (c)(1),
(2) Date: Feb. 8, 2022

(87) PCT Pub. No.: WO2021/033401
PCT Pub. Date: Feb. 25, 2021

(65) Prior Publication Data
US 2022/0319726 A1     Oct. 6, 2022

(30) Foreign Application Priority Data

Aug. 21, 2019   (JP) .................................. 2019-151096

(51) Int. Cl.
G21F 1/10   (2006.01)
C08K 3/38   (2006.01)
(Continued)

(52) U.S. Cl.
CPC .................. *G21F 1/10* (2013.01); *C08K 3/38* (2013.01); *C09D 5/32* (2013.01); *C09D 101/02* (2013.01);
(Continued)

(58) Field of Classification Search
None
See application file for complete search history.

(56) References Cited

U.S. PATENT DOCUMENTS 4,390,242 A   6/1983   Tatsumi
7,524,438 B2  4/2009   Malalel et al.
(Continued)

FOREIGN PATENT DOCUMENTS

JP   856-135830 A    10/1981
JP   2005-521859 A    7/2005
(Continued)

OTHER PUBLICATIONS

International Search Report dated Sep. 8, 2020, issued in counterpart International application No. PCT/ JP2020/023880, with English translation. (5 pages).
(Continued)

*Primary Examiner* — Joseph D Anthony
(74) *Attorney, Agent, or Firm* — WHDA, LLP

(57) ABSTRACT

The present invention provides a radiation transmission-suppressing film that can protect an imaging apparatus from a radiation without adversely affecting the imaging performance of the imaging apparatus. The radiation transmission-suppressing film of the present invention includes a polyvinyl alcohol-based resin film containing boric acid, wherein a product of a boric acid content (wt %) in the polyvinyl alcohol-based resin film and a thickness (μm) of the polyvinyl alcohol-based resin film is 500 or more.

6 Claims, 2 Drawing Sheets

(51) Int. Cl.
*C09D 5/32* (2006.01)
*C09D 101/02* (2006.01)
*C09D 129/04* (2006.01)
*C09D 133/08* (2006.01)
*G21F 1/12* (2006.01)
*G21F 3/00* (2006.01)

(52) U.S. Cl.
CPC ......... *C09D 129/04* (2013.01); *C09D 133/08* (2013.01); *G21F 1/12* (2013.01); *G21F 3/00* (2013.01)

(56) References Cited

U.S. PATENT DOCUMENTS

| | | | |
|---|---|---|---|
| 2005/0001205 A1 | 1/2005 | Malalel et al. | |
| 2009/0059367 A1 | 3/2009 | O'Malley | |
| 2009/0068472 A1* | 3/2009 | Umemoto | G02B 5/3016 156/247 |
| 2009/0153784 A1* | 6/2009 | Kiya | G02F 1/13363 349/106 |
| 2009/0268137 A1* | 10/2009 | Shutou | G02F 1/13363 349/118 |
| 2010/0045909 A1* | 2/2010 | Shutou | G02B 5/3083 349/118 |
| 2011/0285947 A1* | 11/2011 | Murakami | G02F 1/133634 528/367 |

FOREIGN PATENT DOCUMENTS

| | | |
|---|---|---|
| JP | 2010-538320 A | 12/2010 |
| JP | 2013-000006 A | 1/2013 |
| JP | 2013-037222 A | 2/2013 |

OTHER PUBLICATIONS

Office Action dated Sep. 8, 2020, issued in counterpart JP application No. 2019-151096, with English translation. (6 pages).

* cited by examiner

RADIATION TRANSMISSION PREVENTING FILM, AND RADIATION TRANSMISSION PREVENTING FILTER AND IMAGING DEVICE EACH UTILIZING SAID RADIATION TRANSMISSION PREVENTING FILM

TECHNICAL FIELD

The present invention relates to a radiation transmission-suppressing film, and a radiation transmission-suppressing filter and an imaging apparatus each using the radiation transmission-suppressing film.

BACKGROUND ART

Along with the development of an imaging technology and a remote control technology, imaging and video recording under a high-radiation environment have been put into practical use. In, for example, a nuclear power facility, an outer space, or a medical setting, the number of situations where such imaging and video recording are required has been increasing. Under such high-radiation environment, however, there is a problem in that the lifetime of an imaging apparatus shortens under an influence of a radiation. Further, lead or the like that is a general radiation-shielding material is opaque, and is hence inappropriate as a protective member for the imaging apparatus.

CITATION LIST

Patent Literature

[PTL 1] JP 2013-000006 A

SUMMARY OF INVENTION

Technical Problem

The present invention has been made to solve the problem of the related art, and a primary object of the present invention is to provide a radiation transmission-suppressing film that can protect an imaging apparatus from a radiation without adversely affecting the imaging performance of the imaging apparatus.

Solution to Problem

According to one aspect of the present invention, there is provided a radiation transmission-suppressing film, including a polyvinyl alcohol-based resin film containing boric acid, wherein a product of a boric acid content (wt %) in the polyvinyl alcohol-based resin film and a thickness (μm) of the polyvinyl alcohol-based resin film is 500 or more.

In one embodiment, the radiation transmission-suppressing film has a light transmittance of 80% or more.

In one embodiment, the radiation transmission-suppressing film further includes a protective film laminated on one side, or each of both sides, of the polyvinyl alcohol-based resin film.

In one embodiment, the protective film contains at least one resin selected from a cellulose-based resin, a cycloolefin-based resin, and an acrylic resin.

According to another aspect of the present invention, there is provided a radiation transmission-suppressing filter, including: the radiation transmission-suppressing film; and a holder for holding the radiation transmission-suppressing film.

In one embodiment, the radiation transmission-suppressing filter includes the two or more radiation transmission-suppressing films.

According to yet another aspect of the present invention, there is provided an imaging apparatus, including the radiation transmission-suppressing filter removably mounted thereto.

Advantageous Effects of Invention

The radiation transmission-suppressing film according to the embodiment of the present invention can exhibit a neutron beam-absorbing function resulting from a boron atom present in boric acid. In addition, boric acid can produce a tetrahydroxyboric acid anion in an aqueous solution to form a hydrogen bond with a polyvinyl alcohol (PVA)-based resin. Accordingly, the radiation transmission-suppressing film according to the embodiment of the present invention can stably exhibit the function while having a simple configuration. Further, the adoption of a laminated structure of the film and a protective film that can exhibit a β ray-absorbing function can achieve a film having a desired radiation transmission-suppressing function. As a result, the radiation transmission-suppressing film according to the embodiment of the present invention may be suitably used as a protective member for an imaging apparatus to be used under a high-radiation environment.

DESCRIPTION OF EMBODIMENTS

Embodiments of the present invention are described below. However, the present invention is not limited to these embodiments.

A. Radiation Transmission-Suppressing Film

A radiation transmission-suppressing film according to an embodiment of the present invention includes a polyvinyl alcohol-based resin film containing boric acid. The product of a boric acid content (wt %) in the polyvinyl alcohol-based resin film and the thickness (μm) of the polyvinyl alcohol-based resin film is typically 500 or more. In one embodiment, the radiation transmission-suppressing film has a light transmittance of 80% or more.

A-1. Overall Configuration of Radiation Transmission-Suppressing Film

Figure 1:
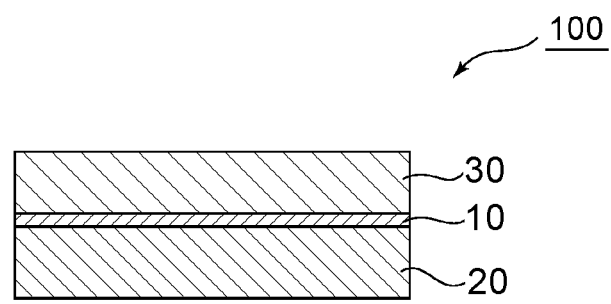
FIG. 1 is a schematic sectional view of a radiation transmission-suppressing film according to one embodiment of the present invention.

FIG. 1 is a schematic sectional view of the radiation transmission-suppressing film according to one embodiment of the present invention. A radiation transmission-suppressing film 100 of the illustrated example includes a PVA-based resin film 10 containing boric acid, a first protective film 20 laminated on one surface thereof, and a second protective film 30 laminated on the other surface thereof. The first protective film 20 and/or the second protective film 30 may be omitted in accordance with purposes and the like.

Each of the first protective film 20 and the second protective film 30 may be laminated on the PVA-based resin film 10 via an adhesion layer (e.g., a pressure-sensitive adhesive layer or an adhesive layer), or may be laminated on the PVA-based resin film 10 without via any adhesion layer so as to be brought into close contact therewith.

The PVA-based resin film 10 may be a single layer (single film) like the illustrated example, or may have a laminated structure of a plurality of PVA-based resin films. The number of the PVA-based resin films to be laminated is not particularly limited as long as a boric acid content in each of the PVA-based resin films and the thickness of the film satisfy a desired relationship.

The light transmittance of the radiation transmission-suppressing film is preferably 80% or more, more preferably 85% or more, still more preferably 90% or more. The radiation transmission-suppressing film according to the embodiment of the present invention may be suitably used as a protective member for an imaging apparatus to be used under a high-radiation environment because the film can achieve both of such high light transmittance and a desired radiation transmission-suppressing function. The light transmittance may be measured with, for example, a UV-visible spectrophotometer (e.g., V-7100 manufactured by JASCO Corporation or LPF-200 manufactured by Otsuka Electronics Co., Ltd.).

A-2. PVA-Based Resin Film Containing Boric Acid

Any appropriate resin may be adopted as a PVA-based resin for forming the PVA-based resin film. Examples of the resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably from 95.0 mol % to 99.95 mol %, more preferably from 99.0 mol % to 99.93 mol %. The saponification degree may be determined in conformity with JIS K 6726-1994. The use of the PVA-based resin having such saponification degree can provide a film excellent in durability. When the saponification degree is excessively high, gelling may occur.

The average polymerization degree of the PVA-based resin may be appropriately selected in accordance with purposes. The average polymerization degree is typically from 1,000 to 10,000, preferably from 1,200 to 5,000, more preferably from 1,500 to 4,500. The average polymerization degree may be determined in conformity with JIS K 6726-1994.

The boric acid content in the PVA-based resin film is preferably 10 wt % or more, more preferably from 12 wt % to 35 wt %, still more preferably from 15 wt % to 30 wt %. When the boric acid content falls within such ranges, a desired radiation (in particular, neutron beam) transmission-suppressing function can be achieved. The boric acid content (wt %) may be determined by using a boric acid amount index calculated from attenuated total reflection spectroscopy (ATR) measurement:

(Boric acid amount index)=(intensity of boric acid peak at 665 cm$^{-1}$)/(intensity of reference peak at 2,941 cm$^{-1}$)

(Boric acid content)=(boric acid amount index)×$a$+$b$ where "a" and "b" each represent a constant obtained by the measurement of a known material, and its value may vary depending on a measuring apparatus.

The thickness of the PVA-based resin film is preferably 5 μm or more, more preferably from 10 μm to 100 μm, still more preferably from 20 μm to 70 μm. When the thickness is excessively small, the radiation (in particular, neutron beam) transmission-suppressing function of the film may not be sufficient. When the thickness falls within such ranges, the nonuniformity of the boric acid content of the film in its thickness direction can be suppressed, and as a result, a desired radiation transmission-suppressing function can be easily achieved. When the PVA-based resin film has a laminated structure of a plurality of PVA-based resin films, the thickness means the thickness of each of the PVA-based resin films.

The product of the boric acid content [unit: wt %] in the PVA-based resin film and the thickness [unit: μm] of the PVA-based resin film (when the film has a laminated structure of a plurality of PVA-based resin films, the total thickness of the respective films) is typically 500 or more, preferably 3,000 or more, more preferably 5,000 or more, still more preferably 7,000 or more. When the PVA-based resin film satisfies such relationship between its boric acid content and film thickness, a desired radiation transmission-suppressing function can be suitably obtained.

The light transmittance of the PVA-based resin film is preferably 80% or more, more preferably 85% or more, still more preferably 90% or more. When the light transmittance of the PVA-based resin film falls within the ranges, a radiation transmission-suppressing film that achieves both of a high light transmittance and a desired radiation transmission-suppressing function can be obtained.

The PVA-based resin film may further contain iodine, or may be free of iodine. The PVA-based resin film that is free of iodine can easily provide a desired light transmittance.

A-3. Method of Producing PVA-Based Resin Film Containing Boric Acid

The PVA-based resin film may be produced by, for example, a method including introducing boric acid into a PVA-based resin film, or a method including subjecting a resin solution containing the PVA-based resin and boric acid to film forming. From the viewpoint of preventing the PVA-based resin from lumping up to obtain a resin film having high uniformity, the method including introducing boric acid into the PVA-based resin film is preferred. The PVA-based resin film to be subjected to the introduction of boric acid may be a single film, may be a laminate of a plurality of films, or may be a laminate of a resin substrate and a PVA-based resin layer formed on its surface by coating.

The method including introducing boric acid into the PVA-based resin film typically includes a boric acid-introducing step of bringing the PVA-based resin film and a boric acid aqueous solution into contact with each other to introduce boric acid, and may further include a washing step and/or a drying step in accordance with purposes. The PVA-based resin film may be preferably brought into contact with the boric acid aqueous solution by immersing the PVA-based resin film in the boric acid aqueous solution. Boric acid produces a tetrahydroxyboric acid anion in the aqueous solution, and hence forms a hydrogen bond with the PVA-based resin through the contact (typically immersion). Thus, boric acid can be easily introduced into the PVA-based resin film.

The boric acid content of the boric acid aqueous solution is, for example, 1 wt % or more, preferably from 3 wt % to 10 wt %. The temperature of the boric acid aqueous solution is, for example, from 20° C. to 45° C. In addition, a time period for the immersion is, for example, from 10 seconds to 300 seconds.

In one embodiment, the PVA-based resin film may be stretched while being immersed in the boric acid aqueous solution. The performance of the stretching can prevent a failure, such as a wrinkle, caused by the swelling of the PVA-based resin film, and can prevent a failure in terms of appearance at the time of the bonding of the film to the protective film.

The stretching is typically uniaxial stretching. The direction of the stretching may be the lengthwise direction (MD direction) of the film, or may be the widthwise direction (TD direction) of the film. A method for the stretching may be dry stretching, may be wet stretching, or may be a combination thereof.

The ratio of the stretching may be, for example, from 1.5 times to 7.0 times, preferably from 2.0 times to 6.0 times.

The washing step is typically performed by immersing the PVA-based resin film having introduced thereinto boric acid in a washing liquid. A typical example of the washing liquid is pure water.

The temperature of the washing liquid is, for example, from 5° C. to 50° C. A time period for the immersion is, for example, from 1 second to 300 seconds.

The drying step may be performed by any appropriate method. Examples of the drying method include natural drying, blow drying, drying under reduced pressure, and heat drying. Of those, heat drying is preferably used. When the heat drying is performed, a heating temperature is, for example, from 30° C. to 100° C. In addition, a time period for the drying is, for example, from 20 seconds to 10 minutes.

A-4. First Protective Film

The first protective film may include any appropriate resin film. Specific examples of a material serving as a main component of the film include thermoplastic resins, such as a cellulose-based resin, a cycloolefin-based resin, an acrylic resin, a polyester-based resin, a polyvinyl alcohol-based resin, a polycarbonate-based resin, a polyamide-based resin, a polyimide-based resin, a polyethersulfone-based resin, a polysulfone-based resin, a polystyrene-based resin, a polyolefin-based resin, and an acetate-based resin. Those resins are each preferably transparent. Those resins may be used alone or in combination thereof. Of those, a cellulose-based resin, a cycloolefin-based resin, and an acrylic resin are preferred. This is because each of those resin films satisfactorily functions as the first protective film, and can retain a high level of adhesive property between the PVA-based resin film and the first protective film, and hence can improve the moist heat resistance of the radiation transmission-suppressing film. Further, this is because a desired radiation (in particular, β ray) transmission-suppressing function can be achieved.

Any appropriate cellulose-based resin may be adopted as the cellulose-based resin. Specific examples thereof include triacetylcellulose (TAC) and a cellulose-based resin containing a lower fatty acid ester as a main component. The cellulose-based resin containing the lower fatty acid ester as a main component is described in, for example, paragraphs 0106 to 0112 of JP 2002-82225 A.

A cellulose-based resin substituted with an acetyl group and a propionyl group may also be used as the cellulose-based resin. The degree to which the resin is substituted with an acetyl group may be represented by an "acetyl substitution degree (DSac)" representing how many of three hydroxy groups present in the repeating unit of cellulose are substituted with an acetyl group on average. The degree to which the resin is substituted with a propionyl group may be represented by a "propionyl substitution degree (DSpr)" representing how many of the three hydroxy groups present in the repeating unit of cellulose are substituted with a propionyl group on average. The acetyl substitution degree (DSac) and the propionyl substitution degree (DSpr) may each be determined by a method described in paragraphs 0016 to 0019 of JP 2003-315538 A (measurement method applying a method of measuring the substitution degree of cellulose acetate through $^1$H-NMR described in A. Blumstein, J. Asrar, R. B. Blumstein, Liq. Cryst. Ordered Fluids 4. 311 (1984)).

The acetyl substitution degree (DSac) and propionyl substitution degree (DSpr) of the cellulose-based resin film preferably satisfy $2.0 \leq DSac+DSpr \leq 3.0$. The lower limit value of the sum "DSac+DSpr" is preferably 2.3 or more, more preferably 2.6 or more. The upper limit value of the sum "DSac+DSpr" is preferably 2.9 or less, more preferably 2.8 or less.

The propionyl substitution degree (DSpr) of the cellulose-based resin film preferably satisfies $1.0 \leq DSpr \leq 3.0$. The lower limit value of the DSpr is preferably 2.0 or more, more preferably 2.5 or more. The upper limit value of the DSpr is preferably 2.9 or less, more preferably 2.8 or less.

More preferably, the acetyl substitution degree (DSac) and propionyl substitution degree (DSpr) of the cellulose-based resin film satisfy $2.0 \leq DSac+DSpr \leq 3.0$ and $1.0 \leq DSpr \leq 3.0$.

The cellulose-based resin substituted with an acetyl group and a propionyl group may have any other substituent except an acetyl group and a propionyl group. Examples of the other substituent include: ester groups, such as a butyrate group; and ether groups, such as an alkyl ether group and an aralkyl ether group.

Any appropriate method may be adopted as a method of substituting the cellulose-based resin with an acetyl group and a propionyl group. For example, cellulose is treated with a strong caustic soda solution to provide alkali cellulose, and the alkali cellulose is acylated with a mixture of predetermined amounts of acetic anhydride and propionic anhydride. The acyl groups of the acylated product are partially hydrolyzed to adjust the substitution degree "DSac+DSpr".

Any appropriate cycloolefin-based resin may be adopted as the cycloolefin-based resin. The cycloolefin-based resin may be typically polymerized by using a norbornene-based monomer as a polymerization unit. Examples of the norbornene-based monomer include: norbornene, alkyl and/or alkylidene substituted products thereof, such as 5-methyl-2-norbornene, 5-dimethyl-2-norbornene, 5-ethyl-2-norbornene, 5-butyl-2-norbornene, and 5-ethylidene-2-norbornene, and polar group (e.g., halogen) substituted products thereof; dicyclopentadiene and 2,3-dihydrodicyclopentadiene; dimethanooctahydronaphthalene, alkyl and/or alkylidene substituted products thereof, and polar group (e.g., halogen) substituted products thereof, such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; and trimers or tetramers of cyclopentadiene, such as 4,9:5,8- dimethano-3a,4,4a,5,8,8a, 9,9a-octahydro-1H-benzoindene and 4,11:5,10:6,9-trimethano-3a,4,4a,5,5a,6,9,9a,10,10a,11,11a-dodecahydro-1H-cyclopentaanthracene. The cycloolefin-based resin may be a copolymer of the norbornene-based monomer and any other monomer.

Any appropriate (meth)acrylic resin may be adopted as the acrylic resin. Examples thereof include poly(meth)acrylic acid esters, such as polymethyl methacrylate, a methyl methacrylate-(meth)acrylic acid copolymer, a methyl methacrylate-(meth)acrylic acid ester copolymer, a methyl methacrylate-acrylic acid ester-(meth)acrylic acid copolymer, a methyl (meth)acrylate-styrene copolymer (e.g., a MS resin), and a polymer having an alicyclic hydrocarbon group (e.g., a methyl methacrylate-cyclohexyl methacrylate copolymer or a methyl methacrylate-norbornyl (meth)acrylate copolymer). Of those, poly($C_{1-6}$ alkyl)(meth)acrylates, such as polymethyl (meth) acrylate, are preferred. A more preferred example thereof is a methyl methacrylate-based resin containing methyl methacrylate as a main component (at from 50 wt % to 100 wt %, preferably from 70 wt % to 100 wt %). The term "(meth)acryl" as used herein means an acryl and/or a methacryl.

Specific examples of the (meth)acrylic resin include: ACRYPET VH and ACRYPET VRL20A manufactured by Mitsubishi Rayon Co., Ltd.; and a high-Tg (meth)acrylic resin obtained by an intramolecular cross-linking or intramolecular cyclization reaction (e.g., a (meth)acrylic resin having a glutaric anhydride structure or a (meth)acrylic resin having a lactone ring structure).

Examples of the (meth)acrylic resin having a glutaric anhydride structure include (meth)acrylic resins having glutaric anhydride structures described in JP 2006-283013 A, JP 2006-335902 A, and JP 2006-274118 A.

Examples of the (meth)acrylic resin having a lactone ring structure include (meth)acrylic resins having lactone ring structures described in JP 2000-230016 A, JP 2001-151814 A, JP 2002-120326 A, JP 2002-254544 A, and JP 2005-146084 A.

The thickness of the first protective film is preferably 15 μm or more, more preferably from 20 μm to 80 μm, still more preferably from 30 μm to 60 μm. When the thickness of the first protective film falls within such ranges, the radiation transmission-suppressing film achieves a desired radiation (in particular, β, ray) transmission-suppressing function, and is applicable to a small imaging apparatus.

A-5. Second Protective Film

A specific configuration of the second protective film is as described in the section A-4 for the first protective film. The configuration of the second protective film may be identical to or different from that of the first protective film.

B. Radiation Transmission-Suppressing Filter

Figure 2:
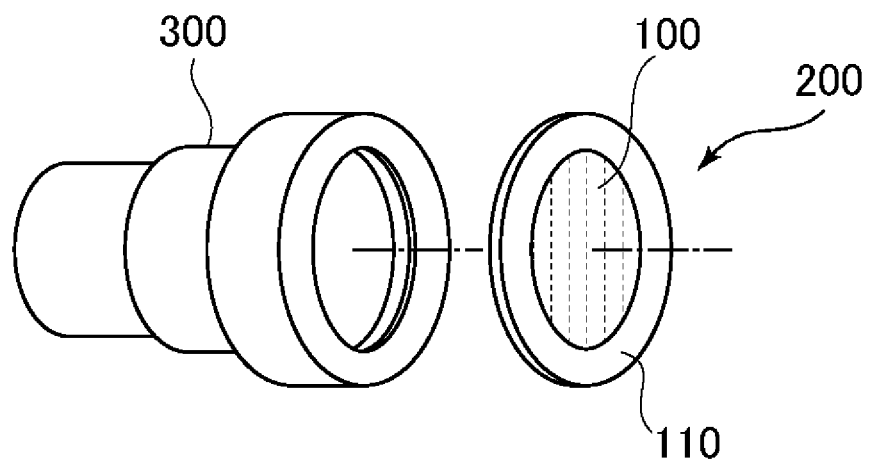
FIG. 2 is a schematic exploded perspective view for illustrating the mounting of a radiation transmission-suppressing filter according to one embodiment of the present invention to an imaging apparatus.

The radiation transmission-suppressing film described in the section A may be used by being incorporated into a radiation transmission-suppressing filter. Accordingly, the embodiment of the present invention also encompasses the radiation transmission-suppressing filter. FIG. 2 is a schematic exploded perspective view for illustrating the mounting of a radiation transmission-suppressing filter according to one embodiment of the present invention to an imaging apparatus. A radiation transmission-suppressing filter 200 of the illustrated example includes the radiation transmission-suppressing film 100 and a holder 110 for holding the radiation transmission-suppressing film 100. The radiation transmission-suppressing film is as described in the section A. Any appropriate configuration may be adopted for the holder. In one embodiment, the radiation transmission-suppressing filter may include the two or more radiation transmission-suppressing films. In this case, in the radiation transmission-suppressing filter, the two or more radiation transmission-suppressing films may be held with one holder. Alternatively, the filter may be formed by combining a plurality of holders each holding the one or two or more radiation transmission-suppressing films.

C. Imaging Apparatus

The radiation transmission-suppressing filter including the radiation transmission-suppressing film described in the section A may be used by being mounted to an imaging apparatus. Accordingly, the embodiment of the present invention also encompasses the imaging apparatus. The imaging apparatus is typically a camera apparatus. As illustrated in FIG. 2, the radiation transmission-suppressing filter 200 is removably mounted to an imaging apparatus (typically the tip portion of the lens of a camera apparatus) 300. The radiation transmission-suppressing film in the radiation transmission-suppressing filter has such predetermined light transmittance as described above, and hence imaging can be performed even when the radiation transmission-suppressing filter is mounted to the imaging apparatus. The plurality of radiation transmission-suppressing filters may be mounted to the imaging apparatus.

EXAMPLES

Now, the present invention is specifically described by way of Examples. However, the present invention is not limited to these Examples.

Example 1

A PVA film having a thickness of 75 μm (manufactured by Kuraray Co., Ltd., product name: VF-PS750, polymerization degree: about 2,400, saponification degree: 99.9%) was stretched at a stretching ratio of 2.3 times while being immersed in a bath having a boric acid content of 3 wt % and a liquid temperature of 40° C. for 60 seconds. Thus, a PVA film containing boric acid was obtained. The resultant PVA film had a thickness of 47 μm. A triacetylcellulose (TAC) film (thickness: 40 μm) was bonded to each of both the sides of the resultant PVA film via a PVA aqueous solution to produce a radiation transmission-suppressing film 1.

The resultant radiation transmission-suppressing film 1 was subjected to the following evaluations. The results are shown in Table 1.

<<Boric Acid Content>>

The intensity of the boric acid peak (665 $cm^{-1}$) of the radiation transmission-suppressing film 1 obtained in Example 1 and the intensity of the reference peak (2,941 $cm^{-1}$) thereof were measured with a Fourier transform infrared spectrophotometer (FT-IR) (manufactured by PerkinElmer, Inc., product name: "SPECTRUM 2000") by attenuated total reflection spectroscopy (ATR) measurement. The boric acid amount index of the film was calculated from the resultant boric acid peak intensity and reference peak intensity by using the following equation, and the boric acid content thereof was determined from the calculated boric acid amount index by using the following equation:

(Boric acid amount index)=(intensity of boric acid peak at 665 $cm^{-1}$)/(intensity of reference peak at 2,941 $cm^{-1}$)

(Boric acid content)=(boric acid amount index)×6.6+0.5 where "6.6" and "0.5" are each a constant obtained on the basis of a calibration curve produced by the measurement of a known material with the Fourier transform infrared spectrophotometer (FT-IR) (manufactured by PerkinElmer, Inc., product name: "SPECTRUM 2000").

<<Light Transmittance>>

The total light transmittance of the radiation transmission-suppressing film 1 was measured with a product available under the product name "LPF-200" from Otsuka Electronics Co., Ltd.

<<Neutron Beam Transmittance>>

Neutron beam irradiation was performed with a nuclear reactor (UTR-KINKI) owned by Kindai University Atomic Energy Research Institute. First, the radiation transmission-suppressing film 1 was bonded as a sample to be evaluated to an imaging plate (manufactured by FUJIFILM Corporation, BAS-IP-ND-2025) that was a photosensitive material, and the sample was irradiated with a neutron beam. Next, the neutron irradiation amount of the photosensitive material was scanned and quantified with an image analyzer (manufactured by GE Healthcare, Amersham Typhoon scanner). The irradiation amount of a portion having bonded thereto each sample was shown as a relative value when the irradiation amount of a portion having bonded thereto no sample (Reference Example) was defined as 100.

Example 2

The five radiation transmission-suppressing films 1 produced in Example 1 were laminated via acrylic pressure-sensitive adhesives (each having a thickness of 20 μm) to produce a radiation transmission-suppressing film 2. The light transmittance and neutron beam transmittance of the resultant radiation transmission-suppressing film 2 were measured in the same manner as in Example 1. The results of the evaluations are shown in Table 1.

Example 3

The ten radiation transmission-suppressing films 1 produced in Example 1 were laminated via acrylic pressure-sensitive adhesives (each having a thickness of 20 μm) to produce a radiation transmission-suppressing film 3. The light transmittance and neutron beam transmittance of the resultant radiation transmission-suppressing film 3 were measured in the same manner as in Example 1. The results of the evaluations are shown in Table 1.

Comparative Example 1

Two TAC films (each having a thickness of 40 μm) were bonded to each other via a PVA aqueous solution to provide a TAC laminate. The five TAC laminates were laminated via acrylic pressure-sensitive adhesives (each having a thickness of 20 μm) to produce a radiation transmission-suppressing film C1. The light transmittance and neutron beam transmittance of the resultant radiation transmission-suppressing film C1 were measured in the same manner as in Example 1. The results of the evaluations are shown in Table 1.

TABLE 1

|  | PVA thickness (μm) | Boric acid content (wt %) | PVA thickness × boric acid content | Light transmittance (%) | Neutron beam transmittance (relative value) |
|---|---|---|---|---|---|
| Example 1 | 47 | 15 | 705 | 92 | 99.4 |
| Example 2 | 235 | 15 | 3,525 | 92 | 97.0 |
| Example 3 | 470 | 15 | 7,050 | 92 | 89.9 |
| Comparative Example 1 | 0 | 0 | 0 | 92 | 100.1 |
| Reference Example | — | — | 0 | — | 100.0 |

Figure 3:
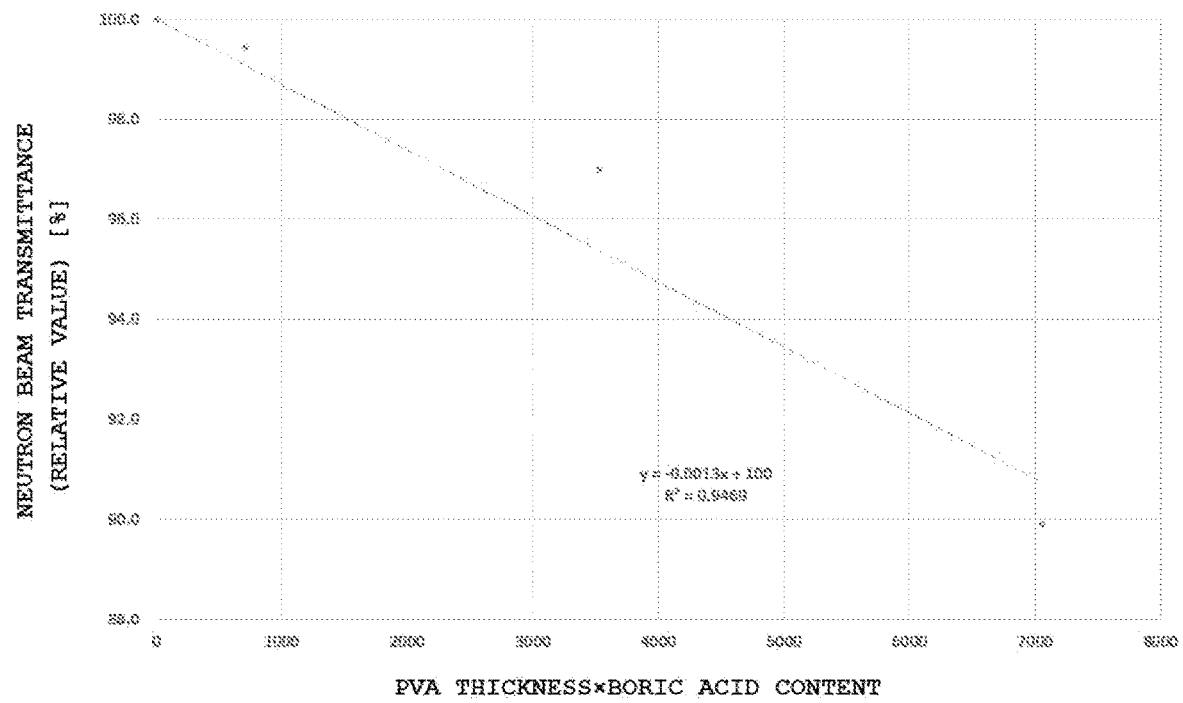
FIG. 3 is a graph for showing a relationship between the product of the thickness and boric acid content of a PVA-based resin film in each of radiation transmission-suppressing films of Examples and Comparative Example, and the neutron beam transmittance (relative value) of the radiation transmission-suppressing films.

A relationship between the product of the thickness and boric acid content of the PVA-based resin film in each of the radiation transmission-suppressing films obtained in Examples and Comparative Example, and the neutron beam transmittance (relative value) of the radiation transmission-suppressing films is shown in FIG. 3.

As shown in Table 1 and FIG. 3, it is recognized that when the product of the thickness and boric acid content of the PVA-based resin film of the radiation transmission-suppressing film was 500 or more, the transmission of a neutron beam was suppressed.

INDUSTRIAL APPLICABILITY

The radiation transmission-suppressing film of the present invention is suitably used as a protective member for an imaging apparatus to be used under a high-radiation environment, such as a nuclear power facility, an outer space, or a medical setting.

REFERENCE SIGNS LIST

10 PVA-based resin film
20 first protective film
30 second protective film
100 radiation transmission-suppressing film
110 holder
200 radiation transmission-suppressing filter
300 imaging apparatus

The invention claimed is:

1. A neutron-radiation-suppressing film that transmits visible light, comprising a polyvinyl alcohol-based resin film containing boric acid, wherein the product of a boric acid content (wt %) in the polyvinyl alcohol-based resin film and a thickness (μm) of the polyvinyl alcohol-based resin film is 500 or more, and the neutron-radiation-suppressing film has a total visible light transmittance of 80% or more.

2. The neutron-radiation-suppressing film according to claim 1, further comprising a protective film laminated on one side, or each of both sides, of the polyvinyl alcohol-based resin film.

3. The neutron-radiation-suppressing film according to claim 2, wherein the protective film contains at least one resin selected from a cellulose-based resin, a cycloolefin-based resin, and an acrylic resin.

4. A neutron-radiation-suppressing filter, comprising:
the neutron-radiation-suppressing film of claim 1; and
a holder for holding the neutron-radiation-suppressing film.

5. The neutron-radiation-suppressing filter according to claim 4, wherein the neutron-radiation-suppressing filter comprises the two or more neutron-radiation-suppressing suppressing films.

6. An imaging apparatus, comprising the neutron-radiation-suppressing filter of claim 4 removably mounted thereto.

\* \* \* \* \*